Sept. 7, 1943.　　　P. B. WILTBERGER　　　2,328,700
MEANS FOR THE DETECTION OF COLOR BLINDNESS
Filed March 12, 1941
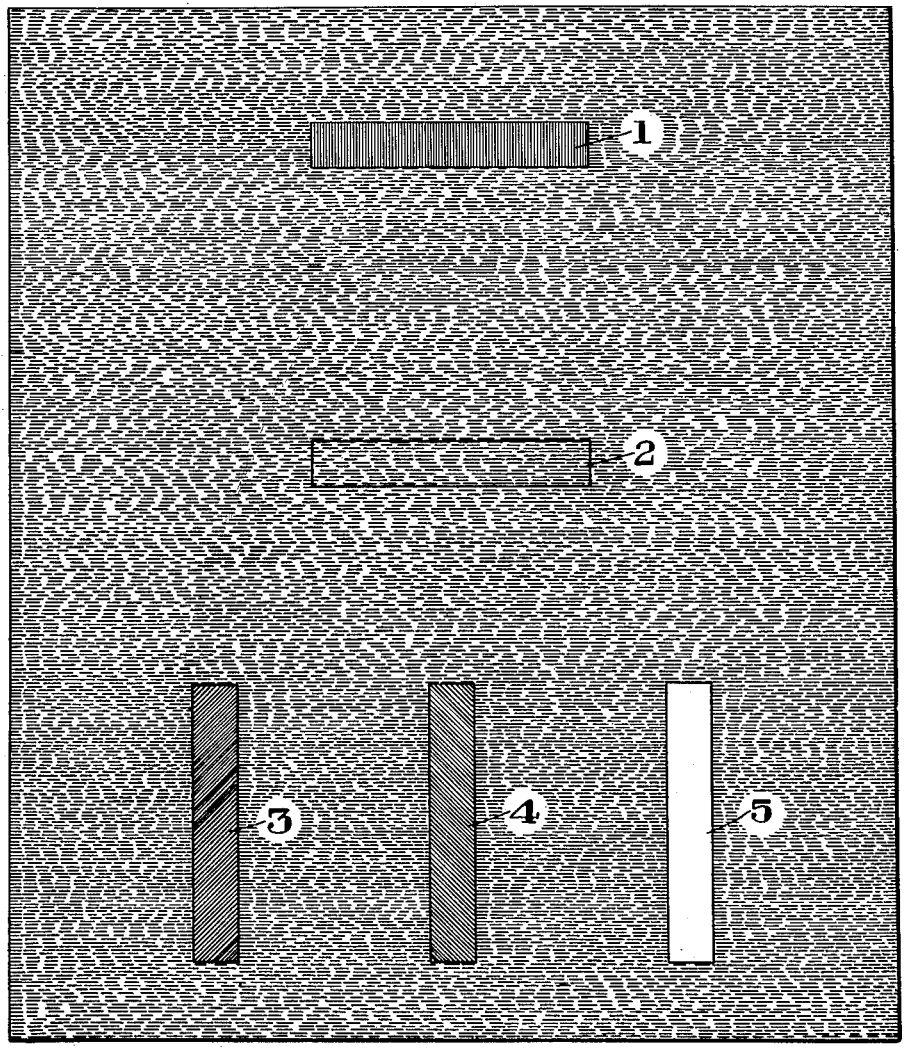
Inventor
PERCY B. WILTBERGER
By W. S. McDowell
Attorney Patented Sept. 7, 1943

2,328,700

UNITED STATES PATENT OFFICE 2,328,700

MEANS FOR THE DETECTION OF COLOR BLINDNESS

Percy B. Wiltberger, Columbus, Ohio

Application March 12, 1941, Serial No. 382,910

3 Claims. (Cl. 35—22)

The object of the present invention is to provide improved means for facilitating and rendering more positive and reliable examinations conducted for detecting the recognition or lack of recognition of color perception of individuals.

The perception of color by the human eye is based on a physico-chemical reaction in the cones of the retina. Each cone perceives all the colors of the visible spectrum. The cones contain a substance, chemical and colloidal in character, which is balanced very delicately and which is very unstable. When in balance, this substance is neutral in color. Light rays falling upon the cones set up an immediate imbalance or reaction in this substance. The amount it is unbalanced determines the color we perceive. Immediately the substance tends to restore itself by a reversible reaction and this reaction goes on until the balance is restablished, becoming neutral again. This reaction and its reversal is almost instantaneous. However, when the stimulus is applied for an appreciable length of time (ten to thirty seconds), the reaction for the neutralization of this chemical substance (to gray) is correspondingly lengthened and can be accurately measured. Not only is the neutralization time lengthened but the reaction itself can be seen. This reaction is qualitative and quantitative.

For example, if one should gaze at a given color for an appreciable length of time, and then shift the gaze to a blank sheet of white or neutral gray colored paper, the complementary color will appear on the paper as an "after-image" and will be of the same size and shape as the original stimulus. It is, however, a "projected" image, viewable only by the person upon whom the test is being made. This "after-image" quickly fades from the sight of the examinee or testee and a neutral gray appears in its place. This test, therefore, involves four stages:

1. Stimulation (color rays impinge on retina).
2. Reaction (color recognized).
3. Reaction reverses (complementary color recognized).
4. Reversal complete and the delicate balance reestablished (gray recognized).

Now, therefore, for example, a normal retinal cone when stimulated with rays from the red end of the spectrum will have the balance of this color receptor unbalanced to a certain degree (reaction—red recognized). Then, the reaction reverses (complementary color blue-green recognized), and the reversible reaction goes on until the balance is reestablished (gray recognized). If the individual undergoing such an examination should keep the stimulus active by gazing for a longer time at a red target or objective, that is, ten to thirty seconds, and then should suddenly shift his gaze to a neutral gray or white background, objective or target, there would appear within three to five seconds, in a person possessing normal color perception, the complementary color, blue-green of the same shape and size as the original red objective or target. The intensity of the complementary "after-image" will vary inversely, as the intensity of the original color viewed. If the original color is a strong one, the complementary "after-image" will be a weak one, and vice versa. If the individual examined is color-blind for red, he lacks some factor in the makeup of the chemical substance which is in the retina cone. When such an individual shifts his gaze from the original stimulus, he does not see the complementary "after-image" for red at all, since he has not perceived the color red but a shade of gray. The "after-image" of gray is white. Having the stimulation of gray, (a shade of black) the reversal reaction would be white. Therefore, if a person is actually color-blind, then this test will very quickly show this to be so.

This test readily separates color-blind individuals from normal and "color-weak" individuals. It is accurate, physiological and can not be memorized and provides a convenient means and mode of operation for enabling an examiner to detect lack of normal color perception on the part of various individuals.

In the accompanying drawing, the single figure illustrates a chart used in carrying out the present invention. Such a chart may consist of a cardboard body possessing a gray or neutral coloration. On one portion of the chart, there is mounted a primary stimulus or target 1 which preferably is of rectangular or bar-like configuration being disposed flatly and in a horizontal position on the chart. The stimulus or target is one which is preferably made up of a non-fading color of high chromatic value and accurate hue. Since ninety-nine per cent. of color defectives fall in the so-called "red-green" blind class, the primary target is preferably uniformly and solidly coated with the color red. Also formed on the chart adjacent to the primary target 1 is a rectangular figure 2 constituting a secondary target, having the marginal proportions of the target 1. This secondary target or objective possesses a neutral gray coloration, for example, the same as that of the chart 1.

By this relative arrangement of the primary and secondary targets, and in conducting a color perception test, the examinee is required to gaze intently for an appreciable period of time, ten to thirty seconds, upon the primary target. At the expiration of this period, the examinee is directed to concentrate his gaze upon the neutral gray secondary target and to specify the color which he perceives therein. If the examinee possesses normal color perception, the "after-image" or color perceived on viewing the secondary target, will be the complement of that comprising the primary target, namely a blue-green coloration.

An adjunct to the test consists in providing the chart or background with a plurality of additional targets, indicated at 3, 4 and 5 in the drawing. Each of these additonal targets possesses the same physical dimensions as the primary target and is disposed vertically of the chart rather than horizontally. The chart 3 may, for example, be brown in color, the chart 4, blue-green in color, and the chart 5, white. After the examinee has been required to gaze upon the primary target for a period of ten to thirty seconds, he is requested to shift his gaze to the additional targets 3, 4 and 5 and advised by the examiner to select the cross which has both bars of the same color. If normal, the examinee will pick out the one which is the complementary color of the primary target. If color-blind, he will pick out the white one. The cross effect produced is the result of viewing the horizontally disposed target 1 and the corresponding "after-image" which is thus viewable on the vertically disposed additional targets.

It will be understood that the primary, secondary and tertiary targets may be produced in many ways. As stated, these targets may be formed from color chips adhesively applied to a gray background which background may be composed of a gray card or the leaves of a book. Each of the targets should be preferably identified by an individual number or other arbitrary symbol so that an examinee may refer to the same by number.

What is claimed is:

1. Apparatus for the detection of color blindness comprising a backing member having a front surface which possesses a uniform and neutral color, a rectangular color- stimulating target disposed flatly on the front surface of said backing member, said target being uniformly and solidly coated with a primary color of accurate hue and high chromatic value, and an "after-image" developing target disposed on said backing in spaced relation from said color-stimulating target, said "after-iamge" target having the marginal configuration of the color-stimulating target and a contrasting uniformly neutral coloration.

2. Apparatus for the detection of color blindness comprising a backing member having a front surface of a uniform neutral color, a substantially rectangular color-stimulating target disposed flatly on the front surface of said backing member, said target being uniformly and solidly coated with a primary color of accurate hue and high chromatic value, and a plurality of "after-image" developing targets disposed on said backing in spaced relation from each other and from said color stimulating target, at least one of said "after-image" targets having a coloration complementary to that of the color-stimulating target and corresponding in marginal configuration thereto.

3. Apparatus for the detection of color blindness comprising a backing member having a front surface which possesses a uniform and neutral color, a rectangular color-stimulating target disposed flatly on the front surface of said backing member, said target being uniformly and solidly coated with a primary color of accurate hue and high chromatic value, and an "after-image" developing target disposed on said backing in spaced relation from said color-stimulating target, said "after-image" target having the marginal configuration of the color-stimulating target and a contrasting coloration.

PERCY B. WILTBERGER.